United States Patent Office 3,647,778
Patented Mar. 7, 1972

3,647,778
REACTIVE DISAZO DYESTUFFS CONTAINING TRIAZINES
Herbert Francis Andrew and Cecil Vivian Stead, Manchester, England, assignors to Imperial Chemical Industries Limited, London, England
No Drawing. Filed Jan. 12, 1970, Ser. No. 2,390
Claims priority, application Great Britain, Jan. 16, 1969, 2,664/69
Int. Cl. C09b 62/08
U.S. Cl. 260—153
5 Claims

ABSTRACT OF THE DISCLOSURE

Dyestuffs represented by the general formula:

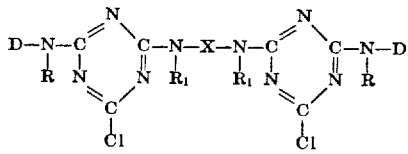

wherein D represents a radical of the azonaphthalene or phenylazo naphthalene series which contains at least three $SO_3H$ groups, Either R and $R_1$ represent H or saturated aliphatic radicals having up to 4 carbon atoms, and X represents a benzene, diphenylene or naphthalene nucleus which may contain substituents or an aliphatic radical having at least two carbon atoms,

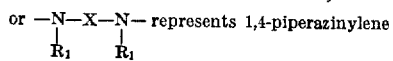

are valuable reactive dyestuffs for cellulose providing a wide range of shades having excellent fastness to washing and to light. They are notable for the high proportion which fixes on the fibre, especially when applied from saline dyebaths.

---

This invention relates to new reactive dyestuffs primarily valuable for the colouring of cellulose textile materials.

According to the invention there are provided dyestuffs represented by the general formula:

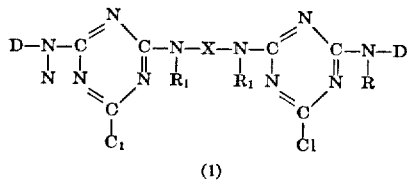

wherein D represents a radical of the azonaphthalene or phenylazo naphthalene series which contains at least three $SO_3H$ groups, Either R and $R_1$ represent H or saturated aliphatic radicals having up to 4 carbon atoms, and X represents a benzene, diphenylene or naphthalene nucleus which may contain substituents or an aliphatic radical having at least two carbon atoms,

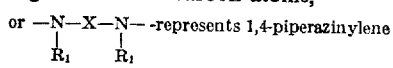

As examples of aliphatic radicals represented by R and $R_1$ there may be mentioned alkyl groups of 1 to 4 carbon atoms, e.g. methyl, ethyl, and butyl, also hydroxyalkyl groups, e.g. β-hydroxyethyl.

As examples of substituents which may be present in benzene or naphthalene nuclei represented by X, there may be mentioned methyl, chlorine, methoxy, carboxylic acid and sulphonic acid. As examples of aliphatic radicals represented by X, there may be mentioned ethylene, 1:2-propylene, 1:3-propylene, 1:4-butylene, ethylaminoethylene and hexamethylene.

As examples of radicals represented by D, there may be mentioned phenylazo naphthyl in which the NR group is attached to a carbon atom of the benzene or naphthalene nucleus; azo naphthalene in which the NR group is attached to a carbon atom of one of the naphthalene nuclei; phenylazonaphthalene and azonaphthalene in which the NR group is attached to an anilino or benzoylamino group pendant on a naphthalene nucleus.

Apart from the substituents already mentioned, the benzene and naphthalene nuclei in D can contain a wide variety of substituents, e.g. OH, $CO_2H$, $NHCOCH_3$. The radical D must contain at least three sulphonic acid groups. Although in general it is preferred that D should contain only the NR group depicted in Formula 1, there are circumstances in which a second NR group can be present, e.g. where the second NR group is o and p to sulphonic acid groups and hence is inert to acylation, e.g. as in 1-amino-8-naphthol-2,4-disulphonic acid.

A preferred class of dyestuffs is that in which the linking group X is phenylene, sulphophenylene or disulphodiphenylene and D—NR is the radical of a phenylazo naphthalene compound containing a NHR group and three sulphonic acid groups, e.g. DNR represents a radical of the formula:

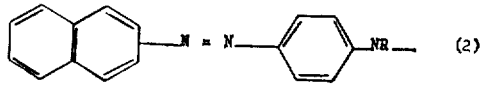

in which the naphthalene nucleus contains two or, preferably three sulphonic acid groups and the benzene nucleus can be further situated e.g. by one or more methyl, methoxy, acetylamino and/or ureido groups, or by at least one sulphonic acid group if the naphthalene nucleus contains less than three; or a radical of the formula:

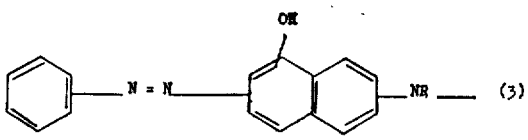

wherein the naphthalene nucleus contains at least one and preferably two sulphonic acid groups and the benzene nucleus can be substituted e.g. by one or more methyl, methoxy, acetylamino and a sufficient number of sulphonic acid groups to bring the total to three.

A further preferred class of dyestuffs is that in which the group X is phenylene and D—NR is the radical of an azonaphthalene compound having 4 sulphonic acid groups, more especially a radical of the formula:

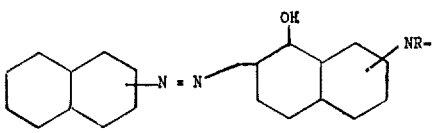

in which each naphthalene nucleus contains two sulphonic acid group, above all, where the NR group is in the 8-position of the naphthalene nucleus and the other naphthalene nucleus is a 1-sulpho-naphth-2-yl radical having a second sulphonic acid group in one of the 5 to 8 positions.

Such dyestuffs are distinguished by their value for use in textile printing and in dyeing by exhaustion methods, in which they offer a degree of fixation over a wide range of liquor-to-goods ratio not possessed by commercially-available reactive dyestuffs. At the same time, the new dyestuffs provide shades of very good light fastness, whereas previously known dyestuffs of similar structure are usually deficient in this property.

The invention also provides a process for manufacture of the new dyestuffs which comprises condensing together two molecular proportions of cyanuric chloride, two molecular proportions of an aminoazo compound of formula DNHR where D and R have the meanings stated above and one molecular proportion of a diamine of formula:

$$R_1NH—X—NHR_1 \quad (4)$$

wherein $R_1$ and X have the meanings stated above.

The above process can conveniently be carried out by stirring a suspension of the cyanuric chloride in an aqueous medium with the aminoazo compound at a temperature of 0 to 20° C. until one chlorine atom of the cyanuric chloride has been replaced by the radical of the dyestuff, then adding the diamine and continuing reaction at a slightly higher temperature, usually in the range 30° to 50° C. until a second halogen atom on the triazine nucleus has reacted with each amino group. Alternatively, the cyanuric chloride can be reacted first with the diamine at the lower temperature to form a bis(dichlorotriazine) derivative and then with the aminoazo compound at the higher temperature. The condensations are preferably carried out at a pH of from 4 to 7, adding an acid-binding agent to neutralise the hydrochloric acid as it is liberated during the reaction. When the reaction is complete the new reactive dyestuffs can be isolated by the usual techniques adopted for isolation of water-soluble reactive dyestuffs, for example, by salting out and filtration, or by spray-drying the reaction mixture in which the dyestuff has been formed. If desired, stabilisers, for example, alkali metal hydrogen phosphates, can be added.

As examples of diamino compounds of Formula 4 which may be used there may be mentioned:

1:3-diaminobenzene,
1:4-diaminobenzene,
1:4-diaminobenzene-2-sulphonic acid,
1:3-diaminobenzene-4-sulphonic acid,
1:4-diaminobenzene-2-carboxylic acid,
2:6-diaminotoluene-4-sulphonic acid,
2:4-diaminotoluene-6-sulphonic acid,
2-methyl-1:4-diaminobenzene,
6-methyl-1:3-diaminobenzene,
6-methyl-1:3-diaminobenzene-4-sulphonic acid,
1-methylamino-4-aminobenzene-2-sulphonic acid,
1-n-butylamino-4-aminobenzene-2-sulphonic acid,
4:4'-diamino-1:1'-diphenyl-2:2'-disulphonic acid,
4:4'-diamino-3:3'-dimethyl-1:1'-diphenyl-2:2'-disulphonic acid,
4:4'-diamino-1:1'-diphenyl-3-sulphonic acid,
1:3-diamino-2:4:6-trimethylbenzene-5-sulphonic acid,
2:6-diaminotoluene-4-sulphonamide,
4:4'-diamino-1:1'-diphenyl-3:3'-dicarboxylic acid,
1:4'-diamino-2:5-dimethoxybenzene,
4:4'-diamino-3:3'-carboxymethoxy-1:1'-diphenyl,
ethylene diamine,
1:3-propylenediamine,
hexamethylene diamine,
1:2-propylenediamine piperazine,
1:4-diaminobenzene-2:5-disulphonic acid,
2-chloro-1:5-diaminobenzene and
2,6-diaminonaphthalene-4,8-disulphonic acid.

As examples of aminoazo compounds which may be used there may be mentioned the following classes:

(i) Monoazo compounds of the formula:

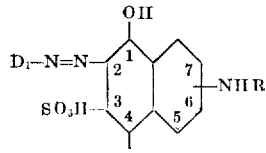

(5)

wherein $D_1$ represents a sulphonated benzene or naphthalene radical which is free from NHR groups, the —NHR group is preferably attached to the 6-, 7- or 8-position of the naphthalene nucleus, and which may contain a sulphonic acid group in the 5- or 6-position of the napthalene nucleus. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those wherein $D_1$ represents a sulphonated phenyl or naphthyl radical which contains a —$SO_3H$ group in ortho position to the azo link; the phenyl radical may be further substituted for example, by halogen atoms such as chlorine, alkyl radicals such as methyl, acylamino groups such as acetyl-amino and alkoxy radicals such as methoxy.

(ii) Monoazo compounds of the formula:

$$D_1—N=N=D_2—NHR \quad (6)$$

wherein $D_1$ stands for a radical as defined for class (1) containing 2 sulphonic acid groups and $D_2$ is a sulpho-1:4-naphthylene radical; the benzene nucleus in $D_1$ may contain further substituents such as halogen atoms, or alkyl, alkoxy, carboxylic acid and acylamino groups.

(iii) Monoazo compounds of the formula:

(7)

wherein $D_1$ represents a radical of the benzene or naphthalene series, and K represents the radical of a naphthol mono-, di- or tri-sulphonic acid having the OH group o- to the azo group, $D_1$ and K together containing at least 3 sulphonic acid groups. $D_1$ preferably represents a radical of the benzene series containing a sulphonic acid group.

As examples of compounds of classes (i) to (iv) there may be mentioned the following:

In class (i):

8-amino-1-hydroxy-2-(2'-sulphophenylazo)naphthalene-3:6-disulphonic acid,
7-amino-2-(2':5'-disulphophenylazo)-1-hydroxy-naphthalene-3-sulphonic acid,
8-amino-1-hydroxy-2:2'-azonaphthalene-1':3:5'-trisulphonic acid,
6-amino-1-hydroxy-2:2'-azonaphthalene-1',3,5'-trisulphonic acid,
8-(3'-aminobenzoylamino)-1-hydroxy-2-(2'-sulphophenylazo)-naphthalene-3:6-disulphonic acid,
8-amino-1-hydroxy-2:2'-azonaphthalene-1':3:5'-6-tetrasulphonic acid,
8-amino-1-hydroxy-2:2'-azonaphthalene-1':3:6-trisulphonic acid.

In class (ii):

1-amino-4-(3':6':8'-trisulphonaphth-2'-ylazo)-naphthalene-6- (and 7-) sulphonic acid,
1-amino-4-(4':8'-disulphonaphth-2'-ylazo)naphthalene-6- (and 7-) sulphonic acid,
1-amino-4-(3':6':8'-trisulphonaphth-2'-ylazo)-naphthalene-8-sulphonic acid.

In class (iii):

2-(4'-amino-2'-ureidophenylazo)naphthalene-3:6:8-tri-sulphonic acid,
2-(4'-amino-2'-acetylaminophenylazo)naphthalene 3:6:8-trisulphonic acid, In class (iv):

8-acetylamino-1-hydroxy-2-(3'-amino-4'-sulphophenylazo)naphthalene-3:6-disulphonic acid,
8-phenylamino-1-hydroxy-2-(4'-amino-2'-sulphophenylazo)naphthalene-3:6-disulphonic acid,
8-benzoylamino-1-hydroxy-2-(5'-amino-2'-sulphophenylazo)naphthalene-3:6-disulphonic acid.

The above process is illustrated by the following examples in which parts are by weight:

EXAMPLE 1

To a solution of 18.9 parts of the trisodium salt of 2[4' - (2":4" - dichloro-1:3:5-s-triazin-6"-ylamino)2'-acetylamino-phenylazo]naphthalene - 3:6:8 - trisulphonic acid (prepared by condensing equimolar proportions of cyanuric chloride and 2-(4'-amino-2'-acetylaminophenylazo)naphthalene-3,6,8-trisulphonic acid as described in British patent specification No. 970,475) in 400 parts of water, there is added a solution of 4.8 parts of the disodium salt of 4:4'-diaminodiphenyl-2:2'-disulphonic acid in 150 parts of water. The mixture is stirred at 40°–45° C. for 3 hours the pH being maintained at 7 by the addition of a 10% aqueous solution of sodium carbonate. The mixture is treated with 75 parts of salt, filtered, and the residue on the filter is then dried.

The dyestuff composition so obtained contains 1 atom of hydrolysable chlorine per azo group present. When applied to cellulose textile materials in conjunction with a treatment with an acid-binding agent, the dyestuff yields reddish-yellow shades having very good fastness to washing and to light.

EXAMPLE 2

A neutral solution of 3.1 parts of the disodium salt of 1,4-diaminobenzene-2,5-disulphonic acid in 100 parts of water is added to a stirred mixture of 3.7 parts of cyanuric chloride, 30 parts of acetone 40 parts of ice and 40 parts of water. The mixture is stirred for 1 hour at 0°–5° C., then neutralized to pH 7 by the addition of a 10% aqueous solution of sodium carbonate. A solution of 12.4 parts of the trisodium salt of 2 amino-5-hydroxy-2':6-azonaphthalene-1':5':7-trisulphonic acid in 200 parts of water is added and the mixture is heated for 3 hours at 45°–50° C., the pH being maintained at 7 by the addition of a 10% aqueous solution of sodium carbonate 40 parts of sodium chloride are added, the mixture is filtered and the residue on the filter is then dried.

The dyestuff composition so obtained contains 1.4 atoms of hydrolysable chlorine for each azo group present. When applied to cellulose textile materials in conjunction with a treatment with an acid-binding agent, the dye yields reddish-orange shades having good fastness to washing and to light.

The following table gives the shades of further new dyestuffs of the invention which are obtained as described in Example 1 or 2 by condensing together one molar proportion of the diamine named in column 3, two molar proportions of cyanuric chloride and two molar proportions of the amino compound named in the second column of the table.

TABLE I

| Example | Amino compound | Diamine | Shade |
|---|---|---|---|
| 3 | 2-[4'-amino-2'-acetylaminophenylazo]naphthalene-3,6,8-trisulphonic acid. | 1,4-diaminobenzene-2-sulphonic acid | Reddish yellow. |
| 4 | do | 2,6,diaminotoluene-4-sulphonic acid | Do. |
| 5 | do | 4,4'-diamino-3,3'-dimethyl-1,1'-diphenyl-2,2'-disulphonic acid. | Do. |
| 6 | 2-[4'-amino-2'-ureidophenylazo]-naphthalene-3,6,8-trisulphonic acid. | 4,4'-diamino-1,1'-diphenyl-2,2'-disulphonic acid | Do. |
| 7 | do | 1,3-diaminobenzene-4-sulphonic acid | Do. |
| 8 | do | 2,6-diaminotoluene-4-sulphonic acid | Do. |
| 9 | do | 1,4-diaminobenzene-3-sulphonic acid | Do. |
| 10 | do | 1,4-diaminobenzene | Do. |
| 11 | do | 1,3-diaminobenzene | Do. |
| 12 | 2-[4'-amino-2'-acetylaminophenylazo]naphthalene-3,6,8-trisulphonic acid. | 6-methyl-1,3-diaminobenzene | Do. |
| 13 | do | 2-methyl-1,4-diaminobenzene | Do. |
| 14 | do | 2,4-diaminotoluene-6-sulphonic acid | Do. |
| 15 | 2-N-methyl-amino-5-hydroxy-1',5',7-trisulpho-2,6-azonaphthalene. | 4,4'-diamino-1,1'-diphenyl-2,2'-disulphonic acid | Reddish orange. |
| 16 | do | 4,4'-diamino-3,3'-dimethyl-1,1'-diphenyl-2,2'-disulphonic acid. | Do. |
| 17 | do | 2,6-diaminotoluene-4-sulphonic acid | Do. |
| 18 | do | Dianisidine | Do. |
| 19 | do | 1,3-diaminobenzene-4,6-disulphonic acid | Do. |
| 20 | do | 4,4'-diamino-1,1'-diphenyl-3-sulphonic acid | Do. |
| 21 | do | 2,6-diaminonaphthalene-4,8-disulphonic acid | Do. |
| 22 | do | m-Phenylene diamine | Do. |
| 23 | 2-(4'-amino-2'-acetylaminophenylazo)naphthalene-4,6,8-trisulphonic acid. | 2,6-diaminotoluene-4-sulphonic acid | Reddish yellow. |
| 24 | do | 4,4'-diamono-3,3'-dimethyl-1,1'-diphenyl-2,2'-disulphonic acid. | Do. |
| 25 | do | m-Phenylene diamine | Do. |
| 26 | 2-(4'-amino-2'-acetylaminophenylazo)naphthalene-4,6,8-trisulphonic acid. | 1,3-diamino-2,4,6-trimethylbenzene-5-sulphonic acid | Do. |
| 27 | 2-(4'-amino-2'-ureidophenylazo)naphthalene-4,6,8-trisulphonic acid. | 4,4'-diamino-1,1'-diphenyl-2,2'-disulphonic acid | Do. |
| 28 | do | p-Phenylene diamine | Do. |
| 29 | 2-(4'-amino-2'-ureidophenylazo)naphthalene-3,6,8-trisulphonic acid. | 1,4-diaminobenzene-2,5-disulphonic acid | Do. |
| 30 | do | 1,3-diamino-2,4,6-trimethylbenzene-5-sulphonic acid | Do. |
| 31 | do | Ethylene diamine | Do. |
| 32 | do | 2,5-diaminobenzoic acid | Do. |
| 33 | do | 3,5-diaminobenzoic acid | Do. |
| 34 | do | 4-amino-N-methylaniline-2-sulphonic acid | Do. |
| 35 | do | 4-amino-N-butyl aniline-2-sulphonic acid | Do. |
| 36 | do | Hexamethylene diamine | Do. |
| 37 | do | Propylene-1,2-diamine | Do. |
| 38 | do | Propylene-1,3-diamine | Do. |
| 39 | do | Piperazine | Do. |
| 40 | 2-(4'-amino-2'-methylphenylazo)naphthalene-3,6,8-trisulphonic acid. | 2,6-diaminotoluene-4-sulphonic acid | Do. |
| 41 | do | p-Phenylene diamine | Do. |
| 42 | 2-(4'-amino-5'-methoxy-2'-methylphenylazo)-naphthalene-3,6,8-trisulphonic acid. | m-Phenylene diamine | Do. |
| 43 | 1-amino-8-hydroxy-2',7-azonaphthalene-1'-3,6-trisulphonic acid. | 1,4-phenylene diamine-2,5-disulphonic acid | Bluish red. |
| 44 | do | 1,3-phenylene diamine -4-sulphonic acid | Do. |
| 45 | do | 2,5-diaminobenzoic acid | Do. |
| 46 | do | m-Phenylene diamine | Do. |
| 47 | 1-amino-8-hydroxy-2',7-azonaphthalene-1',3,5',tetrasulphonic acid. | 1,4-phenylene diamine 2,5-disulphonic acid | Do. |
| 48 | do | m-Phenylene diamine | Do. |
| 49 | do | p-Phenylene diamine | Do. |
| 50 | do | 4,4'-diamino-1,1'-diphenyl-2,2'-disulphonic acid | Do. |
| 51 | 1-amino-8-hydroxy-2',7'-azonaphthalene-1',4,5',6-tetrasulphonic acid. | m-Phenylene diamine | Do. |
| 52 | 8-benzoylamino-1-hydroxy-2-(5'-amino-phenylazo) naphthalene-2',3,6-trisulphonic acid. | 1,4-phenylene diamine-2-sulphonic acid | Do. |
| 53 | 8-acetylamino-1-hydroxy-2-(5'-amino-phenylazo)naphthalene-2',3,6-trisulphonic acid. | do | Do. |
| 54 | 8-phenylamino-1-hydroxy-2-(4'-amino-phenyl-azo) naphthalene-2',3,6-trisulphonic acid. | do | Navy blue. |

TABLE I.—Continued

| Example | Amino compound | Diamine | Shade |
|---|---|---|---|
| 55 | 1,amino-8-hydroxy-7-phenylazonaphthalene-2',3,6-trisulphonic acid | 1,4-phenylene diamine-2-sulphonic acid | Red. |
| 56 | do | Piperazine | Red. |
| 57 | do | p-Phenylene diamine | Red. |
| 58 | do | m-Phenylene diamine | Red. |
| 59 | do | 2,6-naphthylene diamine-4,8-disulphonic acid | Red. |
| 60 | 2-amino-5-hydroxy-6-phenylazonaphthalene-2',5',7-trisulphonic acid | 2,6-diaminotoluene-4-sulphonic acid | Orange. |
| 61 | do | 3,5-diaminobenzoic acid | Do. |
| 62 | 4'-amino-1',2-azonaphthalene-4,7'-8-trisulphonic acid | do | Reddish yellow. |
| 63 | 4'-amino-1',2-azonaphthalene-3,6,7',8-tetrasulphonic acid | m-Phenylene diamine | Do. |

The invention also provides a process for manufacture of the dyestuffs of Formula 1 in which R, $R_1$ and X have the meanings stated above and D-NR- is the radical of a compound of the (aminophenylazo) naphthol or (aminonaphthylazo)naphthol series having at least 3 $SO_3H$ groups, which comprises condensing cyanuric chloride with one half-mole of a diamine of Formula 4 and with one mole of a phenylene- or naphthylene diamine to obtain a tetrazotisable aromatic diamine of the general formula:

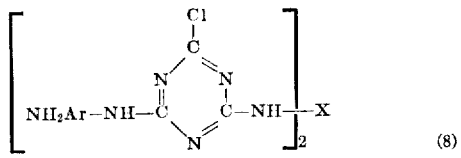

$$(8)$$

in which Ar represents a benzene or naphthalene nucleus, and tetrazotising this diamine of Formula 8 and coupling with two moles of a coupling component, the nucleus Ar and the coupling component together having at least 3 $SO_3H$ groups.

As examples of phenylene- or naphthylene- diamines which may be used, there may be mentioned 1,3-phenylene diamine-4-sulphonic acid, 1,4-phenylene diamine-2-sulphonic acid, 1,4-phenylene diamine-2,5-disulphonic acid, 1,4-naphthylene diamine-2-sulphonic acid.

As examples of naphthol coupling components which may be used, there may be mentioned naphthol sulphonic acids, and acylamino naphthol sulphonic acids, e.g. 2-naphthol-3,6-disulphonic acid, 1-acetylamino-8-naphthol-3,6- and -4,6-disulphonic acids, and 1-benzoylamino-naphthol-3,6- and 4,6-disulphonic acids.

The condensation of the cyanuric chloride with the diamine of Formula 4 and the phenylene- or naphthylene-diamine can be carried out in similar manner to the condensation of cyanuric chloride with the compound of formula DNHR and diamine of Formula 4, as described above. The tetrazotisation of the diamine of Formula 8 is conveniently carried out in aqueous acid medium, in the usual manner at as low temperature as possible, and the subsequent coupling is preferably carried out at as low a temperature and high a pH as will allow coupling to proceed efficiently, in order to keep side-reactions, e.g. hydrolysis of the chlorine atoms on the triazine nucleus, to a minimum.

The following examples are illustrative of this process:

EXAMPLE 64

An ice cold solution of 11.2 parts of the monosodium salt of 2,6-diaminotoluene-4-sulphonic acid in 200 parts of water is added, during 10 minutes, to an ice-cold suspension of 18.4 parts of cyanuric chloride in 200 parts of water and 100 parts of acetone. The pH of the mixture is maintained at 5-6 and finally raised to 7 by the addition of 100 parts of a N solution of sodium hydroxide over 30 minutes. A solution of 21 parts of the monosodium salt of 1,3-diaminobenzene-4-sulphonic acid in 200 parts of water is then added and the mixture is heated to 35° C. and maintained at 35-40° C. for 4 hours whilst a further 100 parts of a N solution of sodium hydroxide is added to maintain the pH at 6-7.

The resulting solution is cooled below 5° C. and 25 parts of concentrated hydrochloric acid are added, followed immediately by 50 parts of a 2 N solution of sodium nitrite. The mixture is stirred for 1 hour and the slight excess of nitrous acid is then destroyed by the addition of a small amount of sulphamic acid.

A solution of 36.5 parts of the disodium salt of 1-benzoylamino-8-naphthol-3,6-disulphonic acid in 400 parts of water is added to the suspension of diazonium salt and the pH is slowly raised to 7 and maintained at this for 2 hours by the addition of a solution of sodium carbonate.

The resulting azo compound is precipitated by addition of 260 parts of sodium chloride, filtered off and dried. When applied to cellulosic textile materials in conjunction with an acid binding agent it yields bluish red shades of excellent fastness to light and wet treatments.

Table II gives further examples of bluish-red dyestuffs of the invention which may be obtained by replacing the 11.2 parts of the monosodium salt of 2,6-diaminotoluene-4-sulphonic acid by the corresponding amount of the compound listed in Column II and replacing the 36.5 parts of the disodium salt of 1-benzoylamino-8-naphthol-3,6-disulphonic acid by the corresponding amount of the compound listed in Column III.

TABLE II

| I | II | III |
|---|---|---|
| 65 | Disodium salt of 4,4'-diaminodiphenyl-2,2'-disulphonic acid | Disodium salt of 2-naphthol-6,8-disulphonic acid. |
| 66 | do | Disodium salt of 1-acetylamino-8-naphthol-3,6-disulphonic acid. |
| 67 | Disodium salt of 2,6-diaminonaphtholene-4,8-disulphonic acid | Do. |
| 68 | do | Disodium salt of 1-amino-8-naphthol-4,4-disulphonic acid. |
| 69 | Monosodium salt of 1,3-diamono-2,4,6-trimethyl-benzene-5-sulphonic acid | Disodium salt of 2-naphthol-6,8-disulphonic acid. |

The invention also provides a process for manufacture of the dyestuffs of Formula 1 in which R, $R_1$, and X have the meanings stated and D-NR-is the radical of a compound of the phenylazo(aminonaphthol) or naphthylazo-(aminonaphthol) series having at least 3 $SO_3H$ groups, which comprises condensing cyanuric chloride with an equimolecular proportion of an aminonaphthol, and with one-half molecular proportion of a diamine of Formula 4, and coupling the resultant product with two moles of a diazotised amine of the benzene or naphthalene series.

The above process can conveniently be carried out in aqueous medium; condensation of the aminonaphthol and the cyanuric chloride is preferably carried out at a temperature of 0-5° C. and at a pH of from 3 to 6, dependent on the particular aminonaphthol used, to prevent interaction between the cyanuric chloride and the hydroxyl group of the aminonaphthol. Reaction of the diamine with the dichloro-s-triazine compound is preferably carried out at a temperature of from 30° to 50° C. and at a pH of from 4 to 7, adding an acid-binding agent to neutralise the hydrochloric acid as it is liberated during the reaction.

If desired, reaction of the cyanuric chloride with the diamine can be carried out first, preferably at 0-5° C. and pH 5–7 and the subsequent reaction with the aminonaphthol is then carried out preferably at from 30 to 50° C. and at a pH of 7.

The subsequent coupling step is preferably carried out at a temperature from 0 to 5° C. and at as low a pH as is possible for efficient coupling to minimise hydrolysis of the chlorine atoms on the triazine ring.

The following examples are illustrative of this process.

EXAMPLE 70

A solution of 36.3 parts of the disodium salt of 1-amino-8-naphthol-3:6-disulphonic acid in 500 parts of ice cold water is added during 15 minutes, to an ice-cold, stirred, suspension of 18.4 parts of cyanuric chloride in 100 parts of acetone and 200 parts of water. The mixture is stirred below 5° C. for 1 hour, then a solution of 5.4 parts of m-phenylene diamine in 100 parts of water is added and the mixture is heated at 30° C. for 4 hours the pH being maintained at about 4 by the addition of a 2 N aqueous solution of sodium carbonate. A suspension in 250 parts of ice cold water of the diazonium salt prepared in the usual manner from 30.3 parts of 2 naphthylamine-1:5-disulphonic acid is added to the above mixture and pH is adjusted to 6 by the addition of 2N sodium carbonate solution. The mixture is stirred for a further 3 hours and is then treated with 40 parts of sodium chloride. The precipitated compound is filtered off and is then dried.

The dyestuff so obtained, when applied to cellulosic textile materials in presence of an acid binding agent yields bluish red shades having excellent fastness to light and wet treatments.

The following Table III gives further examples of dyestuffs of the invention which are obtained by condensing cyanuric chloride successively with 1 molecular proportion of the amino-naphthol sulphonic acid named in the third column and with one-half molecular proportion of the diamine named in the fourth column and coupling the compound so obtained with one molecular proportion of the diazonium salt of the amine named in the 2nd column of the table.

The above process can conveniently be carried out in aqueous medium; condensation of the aminonaphthol and the cyanuric chloride is preferably carried out at a temperature of 0–5° C. and at a pH of from 3 to 6, dependent on the particular aminonaphthol used, to prevent interaction between the cyanuric chloride and the hydroxyl group of the aminonaphthol. The subsequent coupling step is preferably carried out at a temperature from 0 to 5° C. and at as low a pH as is possible for efficient coupling to minimise hydrolysis of the chlorine atoms on the triazine ring. When coupling is complete, the product can be isolated and purified if desired before reaction with the diamine of Formula 4, but usually the diamine can be added to the mixture without an intermediate purification. Reaction of the diamine with the dichloro-s-triazine compound is preferably carried out at a temperature of from 30° to 50° C. and at a pH of from 4 to 7, adding an acid-binding agent to neutralise the hydrochloric acid as it is liberated during the reaction.

The following examples are illustrative of this process:

EXAMPLE 85

A solution of 36.3 parts of the disodium salt of 1-amino-8-naphthol-3,6-disulphonic acid in 500 parts of ice cold water is added during 15 minutes, to an ice-cold, stirred suspension of 18.4 parts of cyanuric chloride in 100 parts of acetone and 200 parts of water. The mixture is stirred at 0–5° C. for 1 hour and a suspension, in 250 parts of water, of the diazonium salt prepared in the usual manner from 30.3 parts of 2 naphthylamine-1:5-disulphonic acid is then added. The mixture is stirred whilst a 2 N solution of sodium carbonate is slowly added to raise the pH to 6 over 45 minutes, and stirred at this pH for a further 2 hours.

19.4 parts of the disodium salt of 4:4'-diamino-1:1'-diphenyl-2:2'-disulphonic acid are added and the mixture is heated to 45° C. stirred for 3 hours at 45–50° C. whilst a 2 N solution of sodium carbonate is added as required to maintain the pH between 5 and 6. 300 parts of sodium chloride are then added and the precipitated dyestuff filtered off and dried. The dyestuff thus obtained when applied to cellulosic textile materials at elevated tempera-

TABLE III

| Example | Amine | Aminonaphthol sulphonic acid | Diamine | Shade |
| --- | --- | --- | --- | --- |
| 71 | Aniline-2,5-disulphonic acid | 2-methylamino-5-naphthol-7-sulphonic acid. | 2,6-diaminotoluene-4-sulphonic acid | Orange red. |
| 72 | Orthanilic acid | 1-amino-8-naphthol-3,6-disulphonic acid. | m-phenylene diamine | Red. |
| 73 | do | do | 3,5-diaminobenzoic acid | Red. |
| 74 | Metanilic acid | do | 4,4'-diamino-1,1'-diphenyl-2,2'-disulphonic acid. | Red. |
| 75 | 4-methylaniline-2-sulphonic acid | do | do | Red. |
| 76 | Aniline-2,5-disulphonic acid | do | m-Phenylene diamine | Red. |
| 77 | 2-naphthylamine-4,8-disulphonic acid | do | do | Bluish red. |
| 78 | 2-naphthylamine-1,5-disulphonic acid | do | 3,5-diaminobenzoic acid | Do. |
| 79 | do | do | 2,6-diaminotoluene-4-sulphonic acid | Do. |
| 80 | Aniline-2,5-disulphonic acid | 2-amino-5-naphthol-7-sulphonic acid | do | Orange. |
| 81 | 2-naphthylamine-1,5-disulphonic acid | do | 4-amino-N-methylaniline-2-2-sulphonic acid. | Reddish orange. |
| 82 | do | do | 3,5-diaminobenzoic acid | Reddish orange. |
| 83 | do | do | 4,4'-diamino-1:1'-diphenyl-2,2'-disulphonic acid. | Do. |
| 84 | do | 1-amino-8-naphthol-4,6-disulphonic acid. | m-phenylene diamine | Bluish red. |

The invention also provides a process for manufacture of the dyestuffs of Formula 1 in which R, $R_1$, and X have the meanings stated and D—NR— is the radical of a compound of the phenylazo(aminonaphthol) or naphthylazo(aminonaphthol) series having at least 3 $SO_3H$ groups, which comprises condensing cyanuric chloride with an equimolar proportion of an aminonaphthol, coupling the resultant product with a diazotised amine of the benzene or naphthalene series and condensing two moles of the resultant product with one mole of a diamine of the general Formula 4, the aminonaphthol and amine together containing at least 3 $SO_3H$ groups.

ture in the presence of an acid binding agent yields bluish red shades of excellent fastness to light and wet treatments.

The following Table IV gives further examples of dyestuffs of the invention which may be obtained as described in the previous example by coupling the N-2':4'-dichloro-s-triazin-6'-yl derivative of the aminonaphtholsulphonic acid named in the third column with the diazonium salt of the amine named in the second column and reacting 1 molecular proportion of the dichlorotriazinyl compound so obtained with half a molecular proportion of the diamine named in the fourth column of the table.

TABLE IV

| Example | Amine | Aminonaphthol sulphonic acid | Diamine | Shade |
|---|---|---|---|---|
| 86 | Orthanilic acid | 1-amino-8-naphthol-3,6-disulphonic acid | 1,3-diaminobenzene | Red. |
| 87 | 4-methylaniline-2-sulphonic acid | do | 2,6-diaminotoluene-4-sulphonic acid | Red. |
| 88 | 2-naphthylamine-1,5-disulphonic acid | do | 1,3-diaminobenzene | Bluish red. |
| 89 | do | do | 1,4-diaminobenzene | Do. |
| 90 | Aniline-2,5-disulphonic acid | 2-amino-5-naphthol-7-sulphonic acid | 4,4'-diamino-1,1'diphenyl-2,2'-disulphonic acid | Orange. |
| 91 | 2-naphthylamine-1,5-disulphonic acid | 2N-methylamino-5-naphthol-7-sulphonic acid | 2,6-diaminobenzoic acid | Reddish orange. |
| 92 | do | 1-amino-8-naphthol-4,6-disulphonic acid | 1,3-diaminobenzene | Do. |
| 93 | Aniline-2,5-disulphonic acid | 2N-methylamino-5-naphthol-7-sulphonic acid | 2,6-diaminotoluene-4-sulphonic acid | Orange. |
| 94 | Aniline-2,4-disulphonic acid | 2-amino-5-naphthol-7-sulphonic acid | 3,5-diaminobenzoic acid | Do. |
| 95 | Aniline-2,5-disulphonic acid | do | 2,6-diaminotoluene-4-sulphonic acid | Do. |
| 96 | Aniline-2,4-disulphonic acid | 2-N-methyl-amino-5-naphthol-7-sulphonic acid | 3,5-diaminobenzoic acid | Do. |

The invention also provides a process for manufacture of the dyestuffs of Formula 1 in which R, R₁ and X have the meanings stated above and D—NR— is the radical of a compound of the (aminophenylazo)naphthol or (aminonaphthylazo)naphthol series having at least 3 SO₃H groups, which comprises condensing cyanuric chloride with one molar proportion of a phenylene- or naphthylene-diamine, diazotising the mono-amino compound so obtained and coupling with a naphthol coupling component and condensing two molecular proportions of the resulting compound of formula:

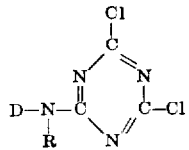

with one molecular proportion of a diamine of Formula 4.

The above process can conveniently be carried out in aqueous meduim, the condensation being carried out, in general, at 0–10° C. for replacement of the first chlorine atom of the cyanuric chloride and at 30–50° C. for replacement of the second chlorine atom. In general, the condensations should be carried out at a pH of 4 to 7, adding an acid-binding agent to neutralise the hydrochloric acid as it is liberated during the reaction. The couplings should be carried out at as low a temperature and as low a pH as will operate efficiently to avoid hydrolysis of chlorine from the triazine nucleus.

The following example and table illustrate the above process.

EXAMPLE 97

An ice cold solution of 21 parts of the monosodium salt of 1,3-diaminobenzene-4-sulphonic acid in 200 parts of water is added slowly to an ice-cold suspension of 18.4 parts of cyanuric chloride in 200 parts of water and 100 parts of acetone. The mixture is stirred at 0–5° C. for 1 hour and the pH of the suspension is then raised to 6 by the addition of 100 parts of a N solution of sodium hydroxide. 50 parts of a 2 N solution of sodium nitrite is then added, followed immediately by 25 parts of concentrated hydrochloric acid. The suspension is then stirred for 1 hour at 0–5° C., then the slight excess of nitrous acid is destroyed by addition of sulphamic acid. A solution of 36.5 parts of the disodium salt of 1-benzoylamino-8-naphthol-3,6-disulphonic acid in 400 parts of water is added and the pH of the mixture is raised to 7 by the addition of further N sodium hydroxide solution and maintained at this pH for 1 hour. A solution of 18.1 parts of the disodium salt of 2,6-diamino-naphthalene-4,8-disulphonic acid in 200 parts of water is added and the mixture is heated to 35° C. and stirred at this for 4 hours whilst maintaining the pH at 6–7 by the addition of 100 parts of N sodium hydroxide solution.

260 parts of sodium chloride are then added and the precipitated dyestuff filtered off and dried. When applied to cellulosic textile materials in conjunction with an acid binding agent it yields bluish red shades of excellent fastness to light and wet treatments.

The following Table IV gives further examples of dyestuffs of the invention which are obtained when the 36.5 parts of the disodium salt of 1-benzoylamino-8-naphthol-3,6-disulphonic acid and 18.1 parts of the disodium salt of 2,6-diaminonaphthalene-4,8-disulphonic acid are replaced by the appropriate amounts of the compounds listed in Columns II and III. Column IV lists the shade obtained.

TABLE IV

| I | II | III | IV |
|---|---|---|---|
| 98 | Disodium salt of 4,4'-diamino-3,3'-dimethyldiphenyl-6,6'-disulphonic acid. | Disodium salt of 8-acetylamino-1-naphthol-3,6-disulphonic acid. | Bluish red. |
| 99 | Disodium salt of 2,6-diaminonaphtholene-4,8-disulphonic acid | do | Do. |
| 100 | do | Disodium salt of 2-naphthol-3,6-disulphonic acid | Do. |
| 101 | do | Disodium salt of 2-naphthylamine-5,7-disulphonic acid | Orange. |

The new reactive dyestuffs are valuable for colouring cellulose textile materials, for example, textile materials comprising natural or regenerated cotton. For colouring such materials, the new dyestuffs are preferably applied, either by a printing but preferably a dyeing process, to the cellulose textile material in conjunction with a treatment with an acid-binding agent, e.g. caustic soda, sodium carbonate, phosphate, silicate or bicarbonate, which may be applied to cellulose textile material before, during or after the application of the dyestuff. When so applied, the new dyestuffs react with the cellulose and yield shades possessing excellent fastness to washing.

We claim:

1. A disazo dyestuff having the formula

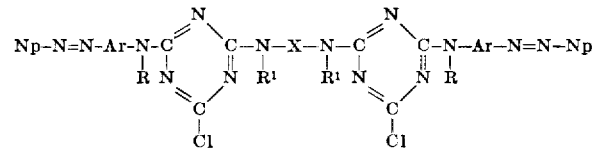

wherein Np represents a member selected from the group consisting of naphthyl substituted with 1–3 sulphonic acid groups and naphthyl substituted with 1–3 sulphonic acid groups and a member selected from the group consisting of OH, NH₂, anilino, acetylamino and benzoylamino, the maximum number of substituents being 4; Ar is selected from the group consisting of benzene, benzene substituted with 1–2 members selected from the group consisting of —NHCOCH₃, —NHCONH₂, —CH₃, —OCH₃, —SO₃H, naphthylene substituted with 1–2 —SO₃H groups and —OH; Np and Ar together containing 3–4 —SO₃H groups; R represents a member selected from the group consisting of hydrogen and lower alkyl;

—NR¹—X—NR¹— represents N,N'-piperazylene or a diamine wherein R¹ is selected from the group consisting of hydrogen and lower alkyl and X is selected from the group consisting of phenylene, sulphophenylene, disulphophenylene, tolylene, sulphotolylene, trimethylsulphophenylene, carboxyphenylene, disulphonaphthalene, sulphodiphenylene, disulphodiphenylene, dimethoxydiphenylene, disulphodimethyldiphenylene, ethylene, propylene, trimethylene and hexamethylene.

2. The dyestuff of claim 1 having the formula:

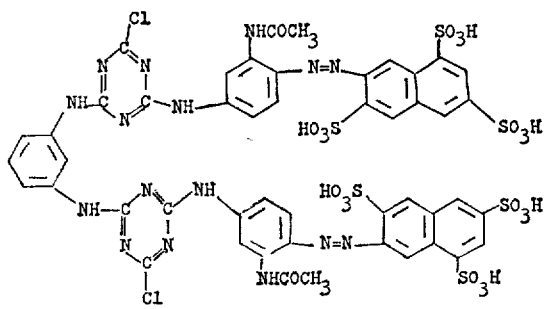

3. The dyestuff of claim 1 having the formula

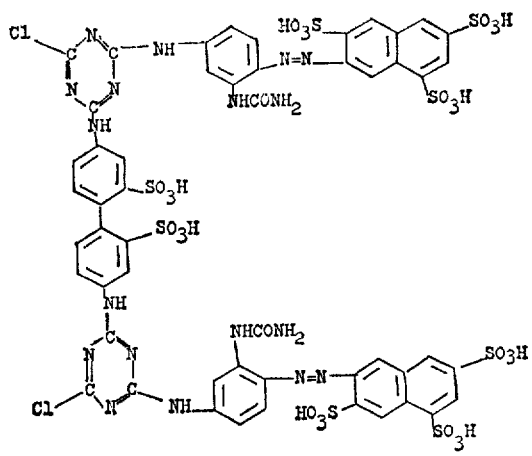

4. A dyestuff as claimed in claim 1 having the formula:

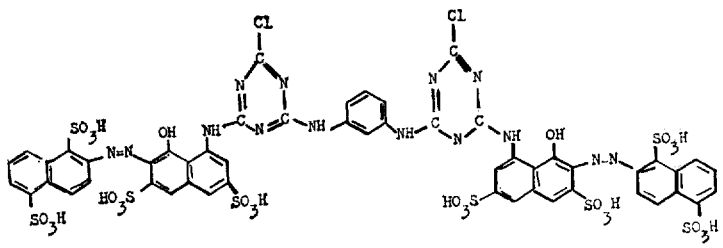

5. A dyestuff as claimed in claim 1 having the formula:

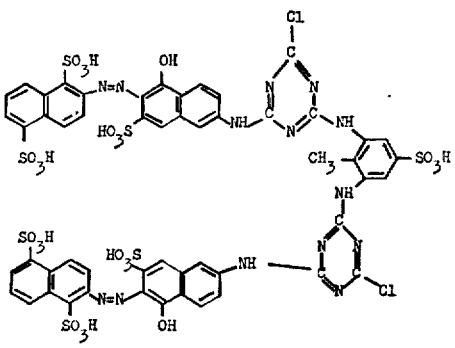

References Cited
UNITED STATES PATENTS 2,768,158  10/1956  Strobel et al. _____ 260—153

JOSEPH REBOLD, Primary Examiner

D. M. PAPUGA, Assistant Examiner

U.S. Cl. X.R.

260—194, 195, 196, 198, 199, 2495, 2498